Dec. 3, 1935.  M. MUSGRAVE  2,022,819
GRINDING APPARATUS
Filed Feb. 10, 1931  2 Sheets-Sheet 1
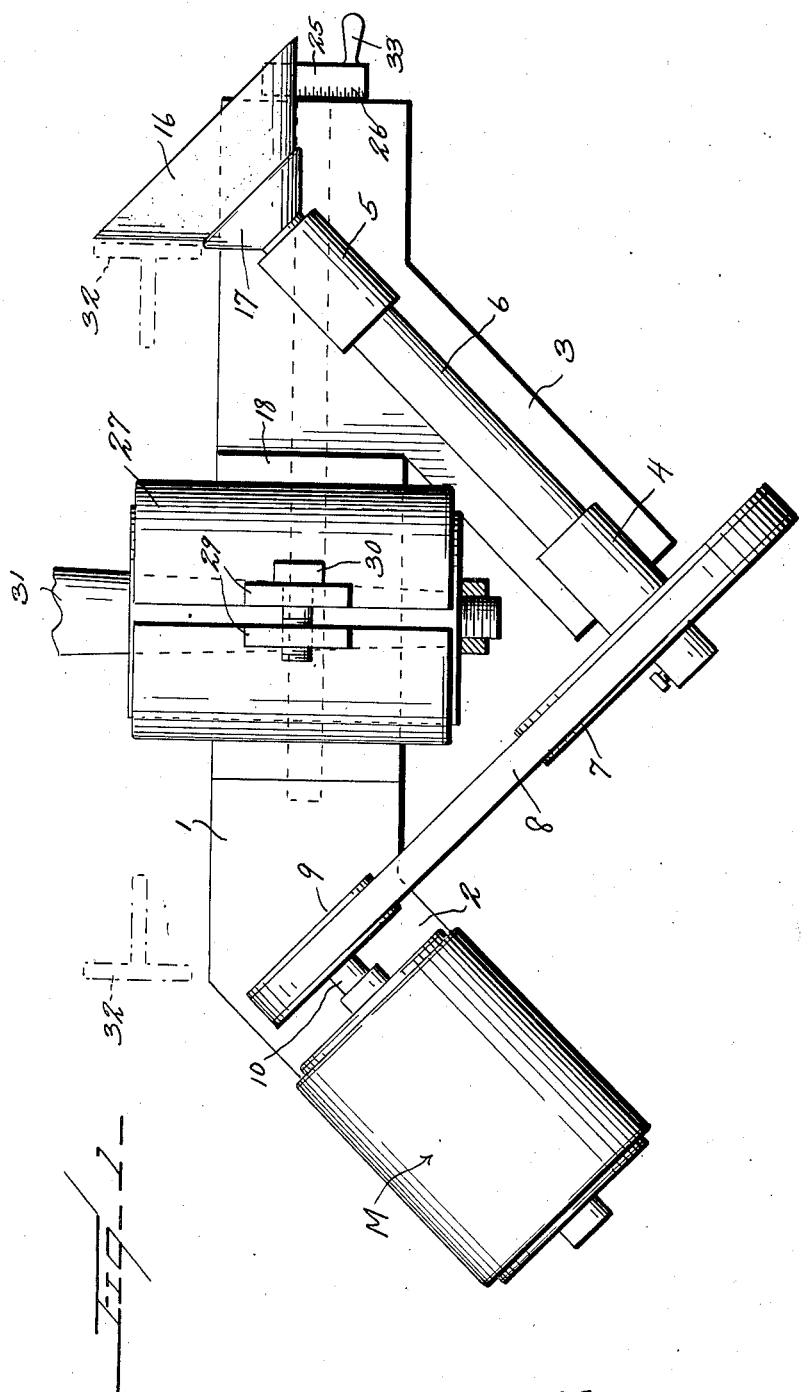
Inventor
M. Musgrave
By Watson E. Coleman
Attorney Dec. 3, 1935.  M. MUSGRAVE  2,022,819
GRINDING APPARATUS
Filed Feb. 10, 1931   2 Sheets-Sheet 2
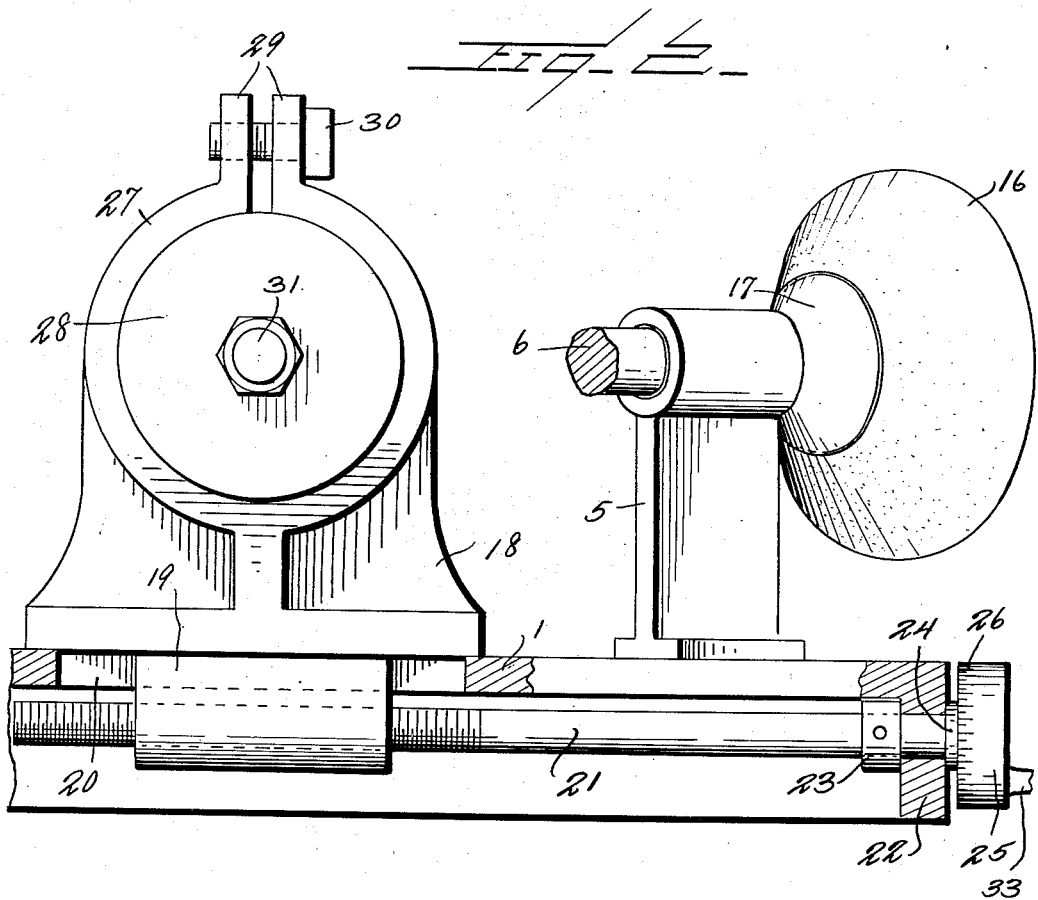
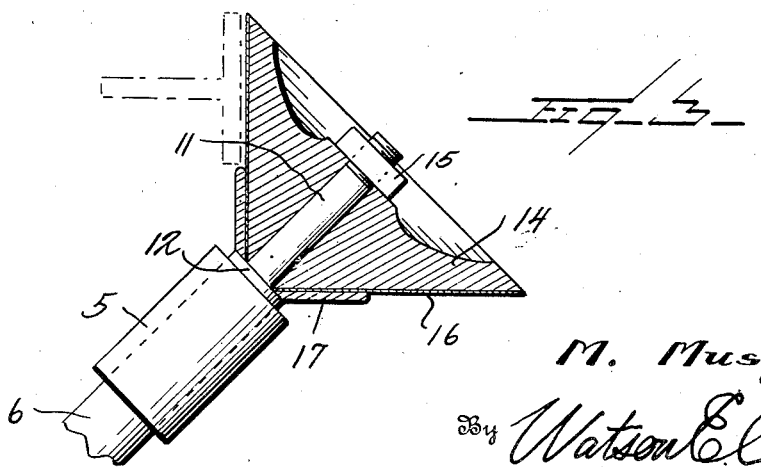
Inventor
M. Musgrave
By Watson E. Coleman
Attorney Patented Dec. 3, 1935

2,022,819

UNITED STATES PATENT OFFICE 2,022,819

GRINDING APPARATUS

Mark Musgrave, Pittsburg, Kans., assignor to Vanita H. Musgrave, Springfield, Ohio Application February 10, 1931, Serial No. 514,819

5 Claims. (Cl. 51—241)

This invention relates to a grinding apparatus, and it is an object of the invention to provide an apparatus of this kind especially designed and adapted for use in the grinding of surfaces of brake linings after they have been riveted or otherwise applied to the brake shoes and after the shoes are in working position on an automobile or kindred vehicle.

Another object of the invention is to provide a means and method of truing internal expanding brake shoes of a vehicle while in place on the vehicle and wherein is employed a truing device having a thin grinding edge permitting it to pass over the entire surface of the brake shoe while in place on the vehicle and wherein the truing device is supported in a manner to permit said truing device to have rotation about the circumference of the brake shoe and in a path concentric with the axis of the vehicle spindle.

Another object of the invention is to provide a device of this kind which is adapted to be supported in working position by the axle or spindle of a vehicle.

The invention also has for an object a method of truing internal expanding brake shoes of a vehicle while in place on the vehicle embodying the steps of expanding the brake shoes to approximately the radius of the brake drum and then mounting a truing device on the vehicle for rotation about the circumference of the brake shoes at a radius determined by the radius of the brake drum and rotating the truing device about the axis of the vehicle axle or spindle and in engagement with the shoes.

It has been found in practice that even with brake shoes ground to the exact radius of the brake drums and with a perfect fit before they are assembled on a vehicle, that owing to an accumulation of small errors in the assembly, including the axle, axle housing, anchor pins, brake shoes, brake lining, brake drum, wheel bearings, etc. it is possible to have an error of at least .035 of an inch in the brake assembly so that even though perfectly fitted before mounting, the assembly might result in one end or one side of the brake shoe being off .035 of an inch when the other end or side of the shoe was touching the drum thus rendering the brakes unsafe and inefficient in operation until they have been worn down in use with several hundred miles driving and a frequent application of the brakes. It is considered by the best engineers that everything over .010 of an inch of error in such assembly results in inefficient braking operation and the necessity for wearing the brakes in actual operation.

This is true even in the best and highest grade automobiles built today as they come from the assembly. It is more apparent and results in larger errors where brakes are re-lined in used cars owing to the wear of certain parts in operation and hence the greater necessity for having the brake lining ground in place on the machine in order to obtain a perfect fit of the brake shoes with the brake drum and render them efficient and safe in operation.

By the improved apparatus and method herein set forth these errors are entirely overcome and the brakes fit the drums 100%, resulting in a perfect braking operation on the vehicle without the necessity of wearing in the brake shoes by the braking operations in the use of the vehicle.

The pins which anchor the brake shoes on a great many cars and trucks are not adjustable and as brake drums even when new vary in diameter as much as fifteen thousandths, and a great deal more on an old car where the drums have been returned, it is well known in actual practice that a brake shoe ground off the vehicle to the proper radius when mounted on the vehicle does not fit the brake drum. The invention has for an object to overcome this disadvantage by providing a method and apparatus whereby each individual brake shoe is ground to assure a perfect fit with the result that when the vehicle is equipped with four wheel brakes perfect balance is assured of all the wheels.

The invention consists in the details of construction and in the combination and arrangement of the several parts of my improved grinding apparatus whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:—

Figure 1 is a plan view with a portion in section illustrating a grinding machine constructed in accordance with an embodiment of my invention and in applied position, the associated brake shoes being diagrammatically indicated by broken lines;

Figure 2 is an enlarged fragmentary view partly in end elevation and partly in section of the structure as illustrated in Figure 1;

Figure 3 is a fragmentary view partly in section and partly in elevation illustrating the means herein employed for holding the abrading sheet in working placement.

As disclosed in the accompanying drawings, 1 denotes an elongated platform continued at one end by a laterally disposed and angularly related table 2. Suitably mounted upon the table 2 is a motor M of an electric type and which is adapted to be connected in a conventional manner with any suitable source of electrical energy. The platform 1 adjacent its opposite end is provided with a second laterally disposed table 3 arranged in the same general direction as the table 2 and substantially in parallelism therewith.

The outer or free end portion of the table 3 carries a bearing 4 in alignment with a second bearing 5 mounted upon the adjacent end portion of the platform 1. The bearings 4 and 5 rotatably support a shaft 6 which has affixed to its extremity adjacent the outer or free end of the table 3 a pulley 7. This pulley 7 is in driven connection through the belt 8 with a pulley 9 carried by the drive or armature shaft 10 of the motor M.

The shaft 6 is continued beyond the bearing 5 by a reduced extension 11 providing an annular shoulder 12 at the junction of the shaft extension 11 with the shaft 6 proper. The extension 11 is adapted to have placed thereon a conoidal member 14 having its apex portion in close contact with the shoulder 12. The shaft extension 11 is directed axially through the member 14 and threaded upon the outer end portion of the shaft extension 11 is a holding or clamping nut 15 which has direct contact with the outer or base wall of the member 14 as particularly illustrated in Figure 3.

Before the member 14 is applied to the shaft extension 11, a sheet or lamination 16 of sandpaper or kindred abrading material is disposed around the peripheral wall or surface of the member 14 and then a cone washer 17 is disposed over the apex portion of the member 14 with the adjacent portion of the lamination or sheet 16 between the washer 17 and the member 14. After this assembly has been applied upon the shaft extension 11 and the nut 15 properly tightened, the washer 17 provides means for effectively maintaining the lamination or sheet 16 in desired placement upon the member 14.

A block or head 18 is placed upon the platform 1 between the tables 2 and 3 for movement or adjustment lengthwise of the platform. As particularly illustrated in Figure 2, this block or head 18 is provided in its under surface with an outstanding lug 19 passing through a slot 20 provided in the platform 1 and disposed lengthwise of said platform. Threaded through the lug 19 is an elongated shank 21.

This shank 21 has its outer end portion freely disposed through a depending end flange 22 and said shank 21 is held against endwise movement with respect to the platform 1 by the thrust collars 23 and 24 fixed to the shank 21 for close contact with opposite faces of the flange 22.

Carried by the outer collar 24 is a circular head 25, the periphery of which being provided with graduations 26 scaled in thousandths of an inch so that upon rotation of the shank 21 the block or head 18 and the applied member 14 may be relatively adjusted one with respect to the other as the requirements of practice may necessitate.

The block or head 18 in its construction, as herein disclosed, comprises a split sleeve 27 provided along its free marginal portions with opposed ears 29 with which are operatively engaged the headed bolt 30 whereby the sleeve 27 may be effectively clamped around a slotted sleeve 28. The sleeve 28 is adapted to be placed upon an axle or spindle 31 of a vehicle after the wheel has been removed and held thereon in the same manner as the wheel itself. In connection with each grinding machine it is intended to provide a plurality of sleeves 28 each being of a character to permit the same to be readily applied upon an axle or spindle of a particular type.

When the apparatus or machine is properly placed for support upon the axle 31 of a vehicle, the head 25 is rotated to assure the proper positioning of the member 14 with respect to the shoe 32, or more particularly the lining thereof to be treated. As is clearly illustrated in the accompanying drawings, it is to be noted that the truing device or member 14 is of a shape and size which permits it to pass over the entire surface of the lining for the brake shoe 32 without contacting with the usual support or backing plate. This desirable operation is assured by the thin grinding edge of the medium or member 14 as afforded by the outer peripheral edge of the member. As is believed to be clearly understood by those familiar with internal expanding brake shoes, the shoe is secured to a backing plate which has a flange which extends partly over the brake shoe. The thin edge afforded by the conoidal member 14 assures said member extending entirely across the brake shoe lining and to extend under this backing plate flange.

The head 25 may be rotated in any manner desired but preferably by a hand grasp 33 suitably carried by the outer face of the head 25.

It is also to be noted that the shaft 6 is disposed on such an angle with relation to the longitudinal axis of the platform 1 to assure a peripheral face or surface of the member 14, and more particularly the abrading lamination 16 carried thereby, to be substantially at right angles to the longitudinal axis of the platform 1 or for effective contact with the lining of the shoe 32.

While the motor is in operation the platform 1 may be readily rotated or rocked upon the axle or spindle 31 to assure the abrading lamination 16 to have effective action upon the brake lining as is believed to be clearly obvious from the foregoing description taken in connection with the disclosure in the accompanying drawings.

It is believed to be clearly apparent that my invention as hereinbefore described sets forth the method of truing internal expanding brake shoes in place on a vehicle embodying the steps of expanding the brake shoes to approximately the radius of the brake drum and then mounting a truing device for rotation about the circumference of the brake shoes at a radius determined by the radius of the brake drum and rotating the truing device about the axis of a vehicle axle or spindle and in engagement with the shoes.

From the foregoing description it is thought to be obvious that a grinding apparatus constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:—

1. A machine for grinding the lining of a brake shoe for a vehicle while carried by the vehicle comprising a platform, means carried by the platform for supporting the same by an axle of the vehicle, said means including a sleeve rotatably engaging the spindle of the vehicle, clamping means carried by the platform and engaging the sleeve, a shaft carried by an end portion of the platform, means for rotating the shaft, and a grinding member carried by the shaft, said grinding member having an abrading surface disposed substantially at right angles to the longitudinal axis of the platform.

2. A machine for grinding the lining of a brake shoe for a vehicle while carried by the vehicle comprising a platform, means carried by the platform for supporting the same by an axle of the vehicle, said means including a sleeve rotatably engaging the spindle of the vehicle, clamping means carried by the platform and engaging the sleeve, a shaft carried by an end portion of the platform, a motor carried by the opposite end portion of the platform, a driving connection between the motor and the shaft, and a grinding member carried by the shaft, said grinding member having an abrading surface disposed substantially at right angles to the longitudinal axis of the platform.

3. A machine for grinding the lining of a brake shoe comprising a platform, means for rotatably supporting said platform by the vehicle, said means including a sleeve rotatably engaging the spindle of the vehicle, clamping means carried by the platform and engaging the sleeve, a grinding element carried by the platform for engagement with the lining of the brake shoe, and means for rotating said element.

4. A machine for grinding the lining of a brake shoe comprising a platform, means for rotatably supporting said platform by the vehicle, said means including a sleeve rotatably engaging the spindle of the vehicle, clamping means carried by the platform and engaging the sleeve, a grinding element carried by the platform for engagement with the lining of the brake shoe, and a motor carried by the platform for rotating said element.

5. An apparatus for grinding applied brake lining comprising rotatable supporting means engaging the spindle of a vehicle, said supporting means including a sleeve rotatably engaging the spindle, a clamp engaging the sleeve, a platform carried by said clamp, a grinding element on the platform, a source of power for operating the grinding element, and means for adjusting the grinding element relative to the brake lining.

MARK MUSGRAVE.